United States Patent
Blosser (10) Patent No.: US 6,963,669 B2
(45) Date of Patent: Nov. 8, 2005

(54) METHOD AND SYSTEM FOR ENHANCING THE PERFORMANCE OF A FIXED FOCAL LENGTH IMAGING DEVICE

(75) Inventor: Robert C. Blosser, Northport, NY (US)

(73) Assignee: BAE Systems Information and Electronic Systems Integration, Inc., Syosset, NJ (US)

( * ) Notice: Subject to any disclaimer, the term of this patent is extended or adjusted under 35 U.S.C. 154(b) by 534 days.

(21) Appl. No.: 09/784,007

(22) Filed: Feb. 16, 2001

(65) Prior Publication Data

US 2002/0159647 A1 Oct. 31, 2002

(51) Int. Cl.[7] .................................................. G06K 9/36
(52) U.S. Cl. ........................................ 382/240; 382/239
(58) Field of Search ................................ 382/232, 236, 382/239, 240, 248, 254, 264, 268, 269, 284, 300, 299; 375/240.02, 240.1, 240.11, 240.19, 240.24; 358/325, 340, 450, 451, 463; 348/143, 144, 135, 137, 46, 49, 50; 345/606, 609, 611

(56) References Cited

U.S. PATENT DOCUMENTS

| | | | | |
|---|---|---|---|---|
| 5,251,037 A | | 10/1993 | Busenberg | 358/213.28 |
| 5,638,370 A | | 6/1997 | Seconi et al. | 348/240 |
| 6,130,705 A | * | 10/2000 | Lareau et al. | 348/144 |
| 6,373,522 B2 | * | 4/2002 | Mathews et al. | 348/144 |
| 6,529,640 B1 | * | 3/2003 | Utagawa et al. | 382/284 |
| 6,564,225 B1 | * | 5/2003 | Brogliatti et al. | 707/104.1 |

FOREIGN PATENT DOCUMENTS

| | | |
|---|---|---|
| EP | 0 503 103 A1 | 9/1992 |
| GB | 2 256 999 A | 12/1992 |

OTHER PUBLICATIONS

Wolberg, George, *Digital Image Warping*, IEEE Computer Society Press, Los Alamitos, CA, pp. 116–125 (1990).

Copy of International Search Report form PCT Application No. PCT/IB02/01479, filed Feb. 8, 2002, 7 pages (search report mailed Jul. 28, 2003).

Holst, Gerald C., "Sampling, Aliasing, and Data Fidelity," JCD Publishing, Winter Park, FL, pp. ix–xiii, 1–29, 130–157, and 239–242.

* cited by examiner

*Primary Examiner*—Yon Couso
(74) *Attorney, Agent, or Firm*—Sterne, Kessler, Goldstein & Fox PLLC (57) ABSTRACT

A group of pixels obtained using an imaging device is converted into a group of pixels having an equal or lower count by receiving at least first and second input pixels having an initial intensity value, forming at least one intermediate intensity value from each of the first and second input pixels, and combining the intermediate intensity values formed from the first and second input pixels to form at least one output pixel. This allows the pixels formed to have improved signal-to-noise characteristics, and it reduces transmission rates. A feature of the present invention allows a distance between the imaging device and an object to be used to select the number of output pixels formed. Another feature of the present invention allows a change in distance between the imaging device and an object to be used to dynamically adjust the number of output pixels formed. A further feature of the invention allows a variable resolution image to be converted to a fixed resolution image.

26 Claims, 9 Drawing Sheets

METHOD AND SYSTEM FOR ENHANCING THE PERFORMANCE OF A FIXED FOCAL LENGTH IMAGING DEVICE

CROSS-REFERENCE TO RELATED APPLICATIONS

Not applicable.

STATEMENT REGARDING FEDERALLY-SPONSORED RESEARCH AND DEVELOPMENT

Not applicable.

REFERENCE TO MICROFICHE APPENDIX/SEQUENCE LISTING/TABLE/COMPUTER PROGRAM LISTING APPENDIX (submitted on a compact disc and an incorporation-by-reference of the material on the compact disc)

Not applicable.

BACKGROUND OF THE INVENTION

1. Field of the Invention

The present invention relates to imaging systems. More particularly, it relates to imaging devices having a fixed focal length.

2. Related Art

Many imaging systems have an imager that receives energy and converts the received energy into a form of data known as pixels. This pixel data can then be stored by these imaging systems for subsequent retrieval and processing and/or transmitted to a remote receiving station for storage and processing. Pixel data can be processed using known signal processing techniques. Improving the signal quality and/or reducing the data output rates of these imaging systems is highly desirable.

Imaging systems having a fixed focal length imager are designed to image objects or areas with a minimum image resolution while operating at a maximum design distance from the objects or areas to be imaged. If these imaging systems are used to image objects at a distance in excess of their maximum design distance, they will not be able to achieve their designed minimum image resolution. These imaging systems are often used, however, to image objects or areas that are nearer then their maximum design distance. For example, certain airborne imaging systems are designed to image ground objects with a minimum image resolution while being carried aboard an aircraft flying at a specified maximum altitude. But, since the operational envelope of an aircraft covers a range of flying altitudes, there are often times when these airborne imaging systems are used while being carried aboard an aircraft flying at an altitude less than the specified maximum design altitude for the imaging system. When this occurs, these imaging systems will have an achievable image resolution in excess of their designed minimum image resolution and a less than optimal signal-to-noise ratio. Moreover, when this occurs, there is an excess of pixel data that must be stored by these imaging systems for subsequent retrieval and processing and/or transmitted to a remote receiving station for storage and processing. This is a less than desirable situation when high speed data transmission or processing is required.

What is needed is a means for improving the signal quality and/or reducing the data output rates of imaging systems having an achievable image resolution in excess of their designed minimum image resolution.

SUMMARY OF THE INVENTION

The present invention is directed to enhancing the performance of a fixed focal length imaging device. An input group of pixels obtained using an imager is converted into an output group of pixels having an equal or lower pixel count. During the conversion process, the average signal-to-noise ratio of the output pixels may be improved.

First and second input pixels having an initial intensity value are received and temporarily stored in a memory. A first intermediate intensity value is formed from the first input pixel based on the initial intensity value of the first input pixel and the value of a first weighting factor. Similarly, a second intermediate intensity value is formed from the second input pixel based on the initial intensity value of the second input pixel and the value of a second weighting factor. At least one intermediate intensity value formed from the first input pixel and at least one intermediate intensity value formed from the second input pixel are combined to form at least one output pixel.

It is a feature of the present invention that the distance between the imager and an object can be used to select the number of output pixels formed.

It is another feature of the present invention that a change in distance between the imager and an object can be used to dynamically adjust the number of output pixels formed.

A further feature of the invention allows a variable resolution image to be converted to a fixed resolution image.

Further features and advantages of the present invention, as well as the structure and operation of various embodiments of the present invention, are described in detail below with reference to the accompanying drawings.

BRIEF DESCRIPTION OF THE FIGURES

The present invention is described with reference to the accompanying figures. In the figures, like reference numbers indicate identical or functionally similar elements. Additionally, the leftmost digit or digits of a reference number identify the figure in which the reference number first appears. The accompanying figures, which are incorporated herein and form part of the specification, illustrate the present invention and, together with the description, further serve to explain the principles of the invention and to enable a person skilled in the relevant art to make and use the invention.

DETAILED DESCRIPTION OF THE PREFERRED EMBODIMENTS

The present invention provides a method and system for enhancing the performance of imaging devices. A group of input pixels obtained by an imager having a fixed focal length is converted into a group of output pixels having an equal or lower count while maintaining image resolution. During this conversion process, the average signal-to-noise ratio (SNR) of the pixels may be improved. A feature of the present invention allows a distance between the imager and an object to be used to select the number of output pixels formed. Another feature of the present invention allows a change in distance between the imager and the object to be used to dynamically adjust the number of output pixels formed. A further feature of the invention allows a variable resolution image to be converted to a fixed resolution image.

As will be apparent from the detailed description herein, the present invention is particularly well adapted for use with an airborne imaging system where the distance between the imager and an object being imaged ranges typically between about 5,000 feet and about 65,000 feet. The invention is not limited to being used only with airborne imaging systems, however.

The detailed description of the present invention that follows begins with a terminology subsection that defines terms used to describe the present invention. This subsection is followed by a detailed description of a preferred application of the present invention. A preferred application of the invention is presented at the beginning of this section in order to aid the reader's understanding of the present invention. Finally, this section concludes by describing in detail both system embodiments and method embodiments of the present invention.

Terminology

The following terms are defined so that they may be used to describe embodiments of the present invention. As used herein:

"Image" or "scene" means an array of pixels.

"Imager" means that portion of an imaging system that converts electromagnetic energy into pixels. An imager can comprise, for example, a photodetector that is responsive to particular wavelengths of electromagnetic energy and any lenses or mirrors used to focus electromagnetic energy onto the photodetector.

"Pan scan imager" means an imager that uses a linear photodetector array and that scans an image by translating or rotating a line array detector across a scene to build up an image one line at a time. The direction of motion of the array is normally orthogonal to the direction of travel of an aircraft. A slowly rotating mirror maybe placed in the optical path between the scene and the photodetector array to avoid smearing and compensate for the forward motion of the aircraft.

"Pixel" means a data structure used to represent a picture element. Any type of pixel data format can be used with the present invention.

"Staring imager" means an imager with a two dimensional photosensitive array that records an image on all pixels simultaneously. A staring imager does not rely on scanning motions to buildup an image one line at a time.

"Tactical reconnaissance imaging" means imaging performed by an aircraft operating below an altitude of about 65,000 feet and flying below an airspeed of about 800 knots.

Example Application of the Present Invention

The present invention is particularly well adapted for use with an airborne imaging system. As will be described herein, the present invention can be used to enhance the performance of either a pan scan imager or a staring imager of a type typically used for tactical reconnaissance imaging. The present invention is described herein with reference to an airborne imaging system because that is a preferred use of the invention by the inventor. However, as will be apparent to a person skilled in the relevant art given the description of the invention herein, the present invention is not limited to being used only with an airborne imaging system. The present invention can be used to enhance the performance of any imaging device having a fixed focal length. The invention can also be used to convert a variable resolution image to a fixed resolution image.

As would be known to a person skilled in the relevant art, the resolution of an airborne imaging system depends on the focal length and pixel size of the system's imager, as well as the range from the imager to the object being imaged. These relationships are illustrated in FIG. 1.

Figure 1:
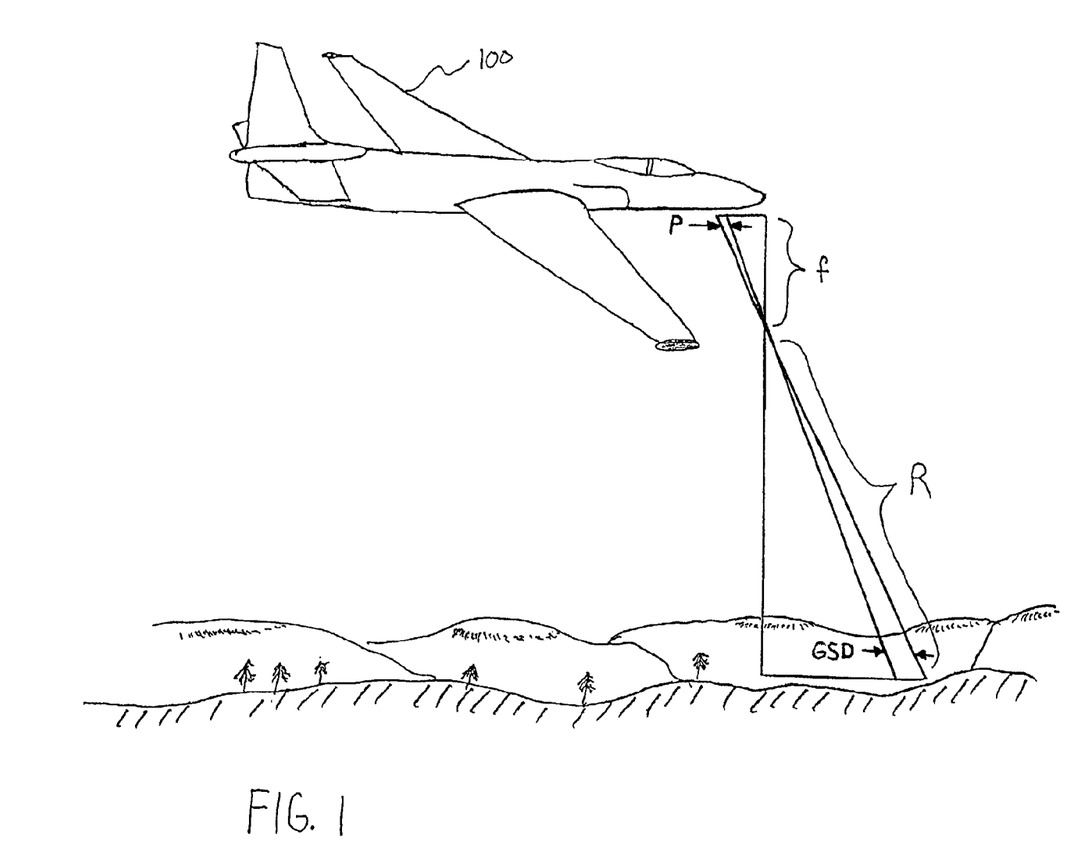
FIG. 1 illustrates the relationship between a pixel length (P) and a ground sample distance (GSD) of an airborne imaging system according to the present invention.

FIG. 1 depicts an aircraft 100 performing tactical reconnaissance imaging. Aircraft 100 has an onboard imaging device (not shown), which is typically contained in the nose of aircraft 100 or in a pod mounted to the underside of the aircraft. The onboard imaging device has an imager (not shown) having a fixed focal length "$f$," and an instantaneous field-of-view "P." The resolution of an imaging device can be described in terms of instantaneous field-of-view and ground sample distance (GSD). Instantaneous field-of-view refers to that portion (angular extent) of a ground object or area falling on a single pixel. GSD refers to a measured ground distance that corresponds to a pitch between adjacent pixels of an image. Instantaneous field-of-view is typically measured in radians, and GSD is typically measured in meters or feet. Small instantaneous field-of-view values or GSD values represent high image resolution.

As aircraft 100 changes altitude, an object on the ground appears to change size to an observer onboard aircraft 100 or to an imaging device having a fixed focal length onboard aircraft 100. For example, if an object on the ground covers one pixel of the imager (not shown) onboard aircraft 100 when aircraft 100 is flying at an altitude of 16,000 feet, the same object will cover two pixels of the imager when aircraft 100 is flying at an altitude of 8,000 feet. This property of an imager having a fixed focal length can be explained using EQ. 1.

$$\frac{P}{f} = \frac{GSD}{R} \qquad \text{EQ. 1}$$

where:

is the length of a pixel of an imager;

$f$ is a fixed focal length of the imager;

GSD is ground sample distance; and

R is an approximate range from the imager to a ground object.

Looking at FIG. 1, it will be apparent that the equality of EQ. 1 is a correct statement of basic trigonometry principles, assuming that the instantaneous field of view (IFOV), $$\frac{P}{f},$$

is a small angle.

Table 1, below, EQ. 1 has been rewritten to show that the number of pixels covered by an object changes with a change in the altitude of aircraft 100. As show in Table 1, the number of pixels covered (in one dimension) by an object doubles as the altitude of aircraft 100 is lowered by one-half. For a slant range of 16,000 feet, a focal length of 3.84 inches, and a pixel length of 20 μm, the GSD is one meter. If a footprint of one meter is viewed from 8,000 feet, it covers a length of 40 μm on the focal plane of the imager, i.e., two of the original 20 μm pixels.

TABLE 1

P = (f · GSD)/R

| P = 20 μm | P = 40 μm |
|---|---|
| f = 3.84 ins | f = 3.84 ins |
| GSD = 1 m | GSD = 1 m |
| R = 16,000 ft | R = 8,000 ft |

For a pan scan imager with fixed focal length, f, designed to achieve a one meter GSD at 16,000 feet, the resolution of the imager is twice as good as necessary at 8,000 feet. The additional resolution of the imager can be traded therefore for additional signal by adding together the signals from each group of two adjoining pixels when flying at an altitude of 8,000 feet, achieving the same resolution as at 16,000 feet, but with twice the signal level.

The pixels on a detector array may be thought of as image sample points with a sampling period equal to the distance between pixel centers. Thus, the spatial frequency of the pixels is 1/period. At an altitude of 16,000 feet, one 20 μm pixel just covers a GSD of one meter, and the sampling frequency corresponding to 20 μm pixels is 50 lines/mm. The impact of changing the altitude of aircraft 100 from 16,000 feet to 8,000 feet is that a GSD of one meter now covers two 20 μm pixels, thereby permitting the sampling frequency of the pixels to be reduced to one-half the prior sampling frequency used at the 16,000 foot altitude (i.e., 25 lines/mm) while still providing the same image resolution (e.g., one pixel for each GSD).

The present invention uses the impact that changing aircraft altitude has on image resolution to enhance the performance of imaging devices having a fixed focal length. The system and method described herein teach one skilled in the relevant art how to convert a series or group of contiguous pixels obtained by an imager having a fixed focal length into a second series or group of pixels of equal or lesser count. The size of the input and output groups of pixels is based upon a repeat interval at which original sampling positions pixels) coincide with sampling positions (pixels) interpolated according to the present invention. In this conversion process, the average signal-to-noise ratio (SNR) of the interpolated pixels is enhanced.

Example System Embodiment of the Present Invention

Figure 5:
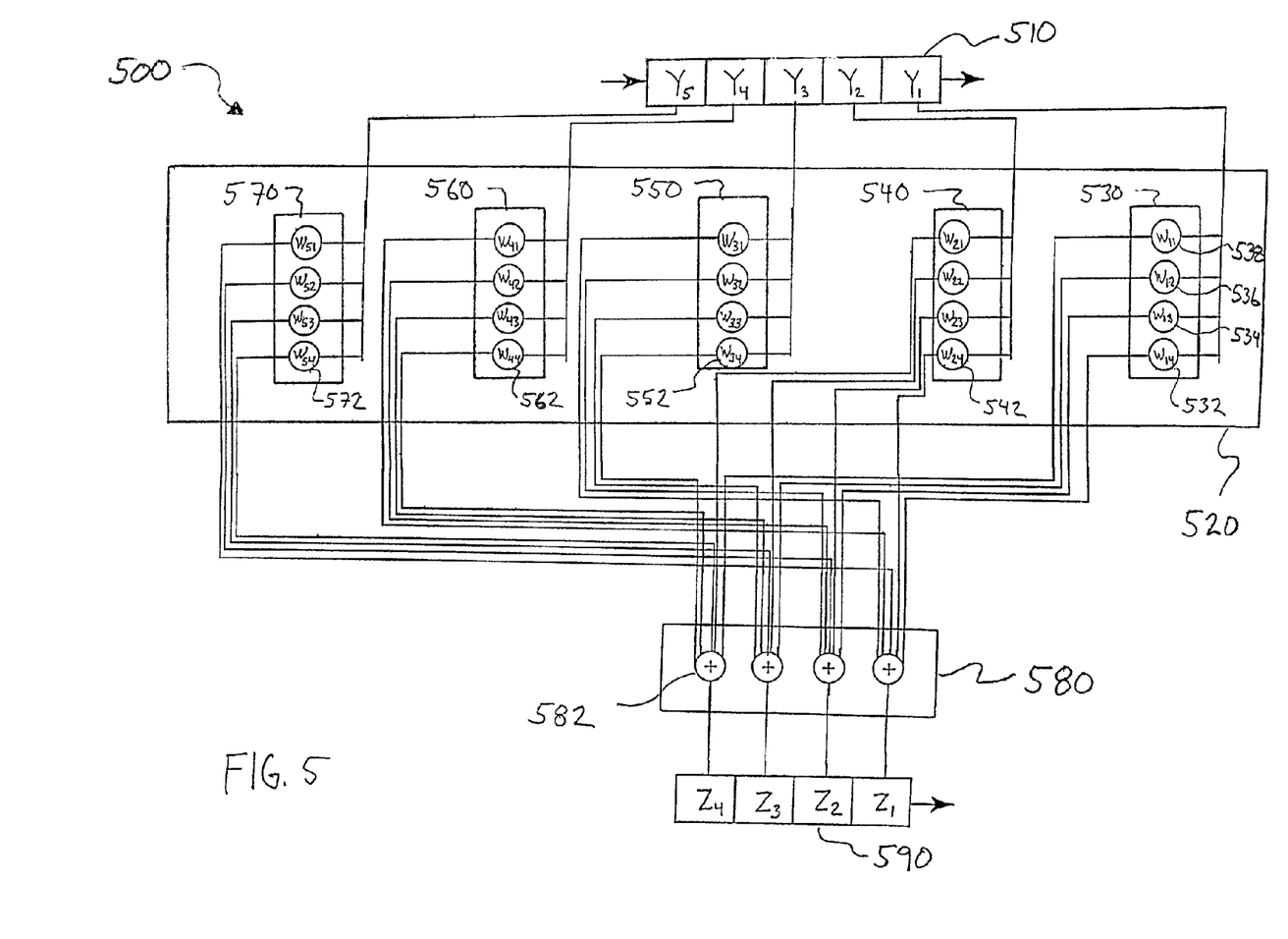
FIG. 5 illustrates the system of the present invention.

FIG. 5 illustrates a system 500 for enhancing the performance of a fixed focal length imaging device. System 500 converts a group of five input pixels into a group of four output pixels. System 500 comprises a pixel receiving module 510, a pixel weighting module 520, and a pixel combining module 580.

Pixel receiving module 510 is typically coupled to the output of an imager (not shown). It may be coupled to a digital filter, however. Digital filters may be used to assure that no frequencies above those desired are present in the input pixels received by pixel receiving module 510. This is done to improve signal quality. Pixel receiving module 510 is shown as receiving five input pixels $\{Y_1, Y_2, Y_3, Y_4, Y_5\}$ from an input stream of pixels (not shown). Pixel receiving module 510 can receive and temporarily store more or less than five pixels. Pixel receiving module 510 can be a buffer.

Pixel weighting module 520 is coupled to pixel receiving module 510. Module 520 comprises five subsets 530, 540, 550, 560, and 570 of four weighting factors or weighting cells. For example, subset 530 comprises weighting cells 532, 534, 536, and 538. The number of weighing cells in each subset is dependent on the number of output pixels formed by system 500. Each weighting factor or weighting cell of pixel weighting module 520 is used to form an intermediate weighting value from an input pixel stored in pixel receiving module 510. Referring to EQ. 2 below, the value for each weighting factor or weighting cell is selected in accordance with an interpolation function.

System 500 can also convert a group of five input pixels into a group of fewer than four output pixels, for example, a group of three, two, or one pixel(s). The values for each weighting cell are adjusted depending on the number of output pixels to be produced and the particular output pixels to be discarded or ignored. For example, if a group of five input pixels is to be converted into two output pixels, the value for each weighting cell $W_{53}$, $W_{54}$, $W_{43}$, $W_{44}$, $W_{33}$, $W_{34}$, $W_{23}$, $W_{24}$, $W_{13}$, and $W_{14}$ is set to zero, and the output pixels $Z_3$ and $Z_4$ are discarded or ignored. Hardware and/or software means can be used for adjusting the values of the weighting cells and for selecting the particular output pixels to be discarded or ignored.

Pixel weighting module 520 can be built from commercially available electronics hardware. For example, pixel weighting module 520 can be built using known discrete small scale integration chips (e.g., digital and/or analog multiplier chips, adder chips, and memory chips) or very large scale integration chips (e.g., an embedded microprocessor). Pixel weighting module 520 can also be built, for example, using a microcontroller or a digital signal processing array. A microcontroller such as the MSC 51, MSC 151, or MSC 251 (or the 8051 or 8052) available from Intel Corporation, Santa Clara, Calif., can be used to implement pixel weighting module 520. In preferred embodiments of the present invention, the values for each weighting cell or factor can be adjusted (e.g., the weighting factors might be calculated and stored in a lookup table in memory, and retrieved from the lookup table as needed).

Pixel combining module 580 is coupled to pixel weighting module 520. As shown in FIG. 5, pixel combining module 580 comprises four addition modules 582. Each addition module 582 combines the output of one weighting cell from each subset of weighting cells to form a single output or pixel.

Pixel combining module 580 is shown coupled to a buffer 590. Buffer 590 receives outputs from pixel combining module 580 and temporarily stores the received outputs. The received outputs or pixels stored in buffer 590 can be, for example, transmitted to a remote receiving station for processing and storage, or they can be stored in a memory (not shown) for subsequent retrieval and processing.

Other system embodiments of the present invention are possible, which convert a preselected number of input pixels (e.g., 8, 16, 32, 64) to a selected number of output pixels. In all embodiments, a distance between the imager and an object to be imaged is used to select the number of output pixels formed, as described below. In some embodiments, a change in distance between the imager and an object to be imaged is used to dynamically adjust the number of output pixels formed.

Example Method Embodiment of the Present Invention

Figure 2:
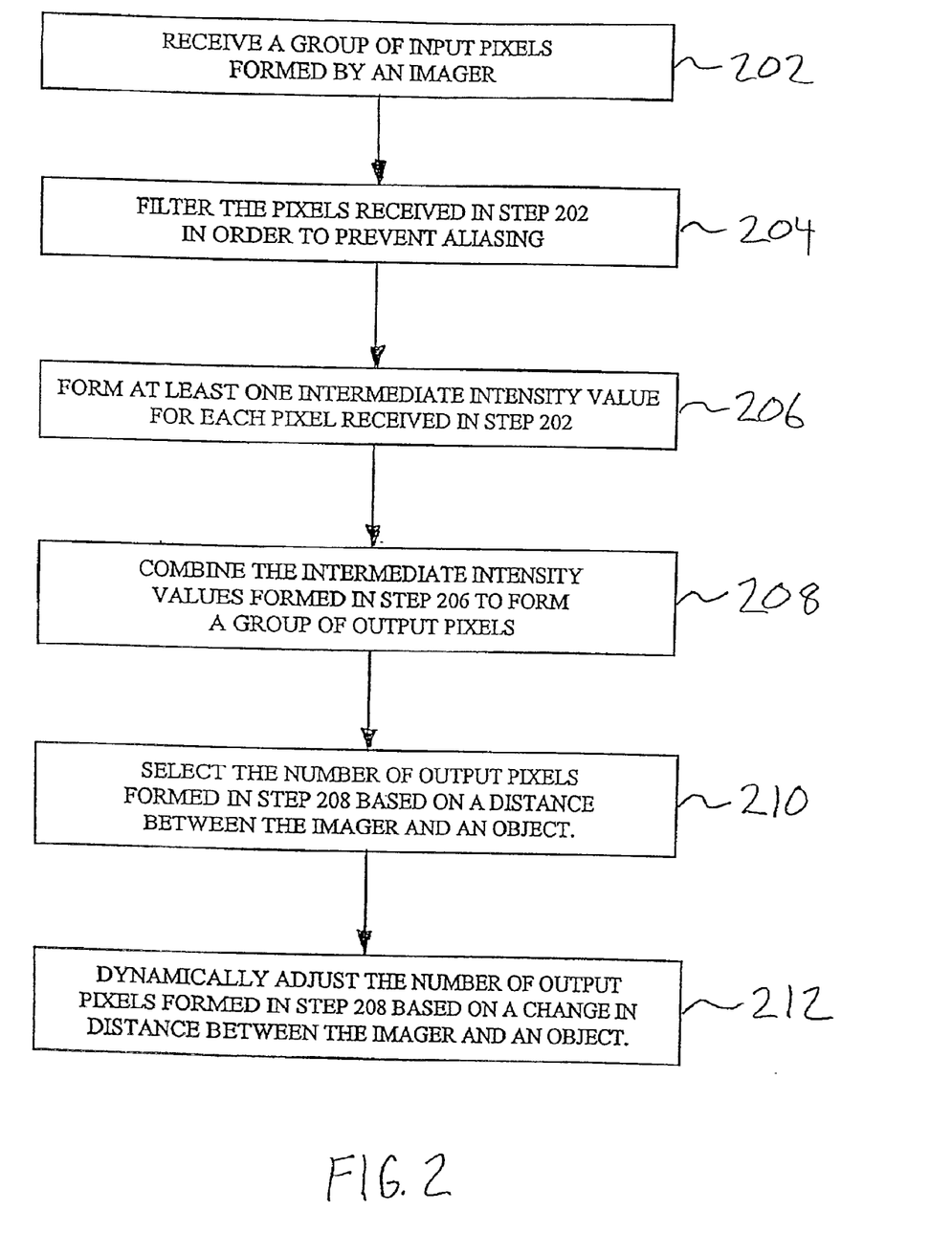
FIG. 2 is a flowchart of the method of the present invention.

FIG. 2 illustrates a flowchart of a method for enhancing the performance of an imaging device having a fixed focal length according to the present invention. This method can be implemented using system embodiments of the present invention (e.g., system 500), and it is described with reference to the features illustrated in FIG. 5. As described below, the method comprises six steps, of which three steps are optional steps.

In step 202, a group of input pixels formed by an imager is received and temporarily stored in a memory, e.g., buffer 510. The group of input pixels received in step 202 is variable as described below (i.e., it is not necessarily five pixels as shown in FIG. 5). Typically, the received group of input pixels will be a contiguous series of pixels obtained by the imager.

In optional step 204, the pixels received in step 202 are filtered in order to prevent aliasing. Step 204 can be performed either before step 202 or after step 202. There are many lowpass filters and/or filtering techniques that can be applied to the pixels received in step 202 in order to prevent aliasing. Two such filters are the $N^{th}$-order Butterworth filter and the Chebyshev filter. See GERALD C. HOLST, SAMPLING, ALIASING, AND DATA FIDELITY FOR ELECTRONIC IMAGING SYSTEMS, COMMUNICATIONS, AND DATA ACQUISITION 239–42 (JDC Publishing, Winter Park, Fla. (1998)) (SPIE Press Series, No. 55). Given the description of the present invention herein, a person skilled in the relevant art will be able to determine whether optional step 204 should be implemented in a given embodiment of the present invention.

Steps 206 and 208 of the method are best described together. In step 206, at least one intermediate intensity value for each pixel received in step 202 is formed. In step 208, the intermediate intensity values formed in step 206 are combined to form a group of output pixels. How to implement steps 206 and 208 will now be described in detail below with reference to the inventor's preferred application of the present invention.

Figure 3:
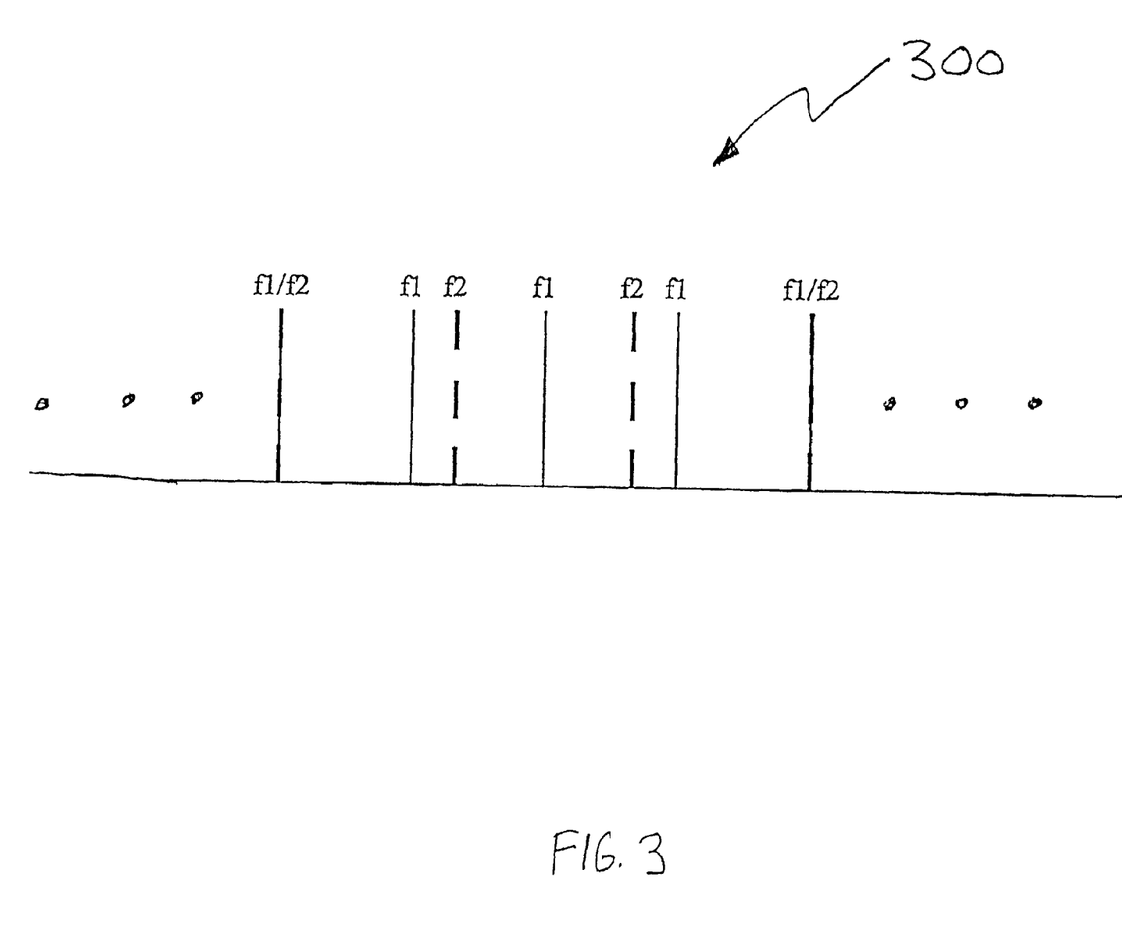
FIG. 3 illustrates sampling locations (f1) obtained from imaging at an arbitrary altitude and the interpolated sample points (f2) used to maintain constant image resolution.

FIG. 3 illustrates two sets of sampling points, one set labeled by $f_1$, and one set labeled by $f_2$. If the set labeled $f_1$, is assigned to the sample points (pixels) obtained by an imager onboard aircraft 100 at an altitude of 16,000 feet, the number of sample points (pixels), labeled $f_2$, needed to achieve the same resolution at an altitude lower than 16,000 feet is less than the number of $f_1$ samples. As described above, only half the number of sampling points is needed at an altitude of 8,000 feet. At altitudes between 8,000 feet and 16,000 feet, more than half the sampling points are needed, but the number needed is still less than the number of $f_1$, sampling points.

Notice in FIG. 3 that two of the $f_1$ and $f_2$ sampling points occur at the same location. The series of sampling points 300 shown in FIG. 3 is cyclical, thus if the series of sampling points $f_1$ and $f_2$ shown were extended, the number of coincident sampling locations would increase. This coincidence of sampling locations is used herein to describe the present invention.

The image of a scene laid out on a focal plane of a staring imager contains a continuous set of two-dimensional intensity values. For simplicity, the description of the present invention herein focuses mainly on a one-dimensional representation of the image (e.g., as can be obtained using a pan scan imager). This description of the present invention can be extended to two dimensions, however, by simply considering the one-dimensional discussion herein as referring to a single line in the array. Thus, the description of the present invention herein can be applied to both a staring imager and a pan scan imager.

Figure 4:
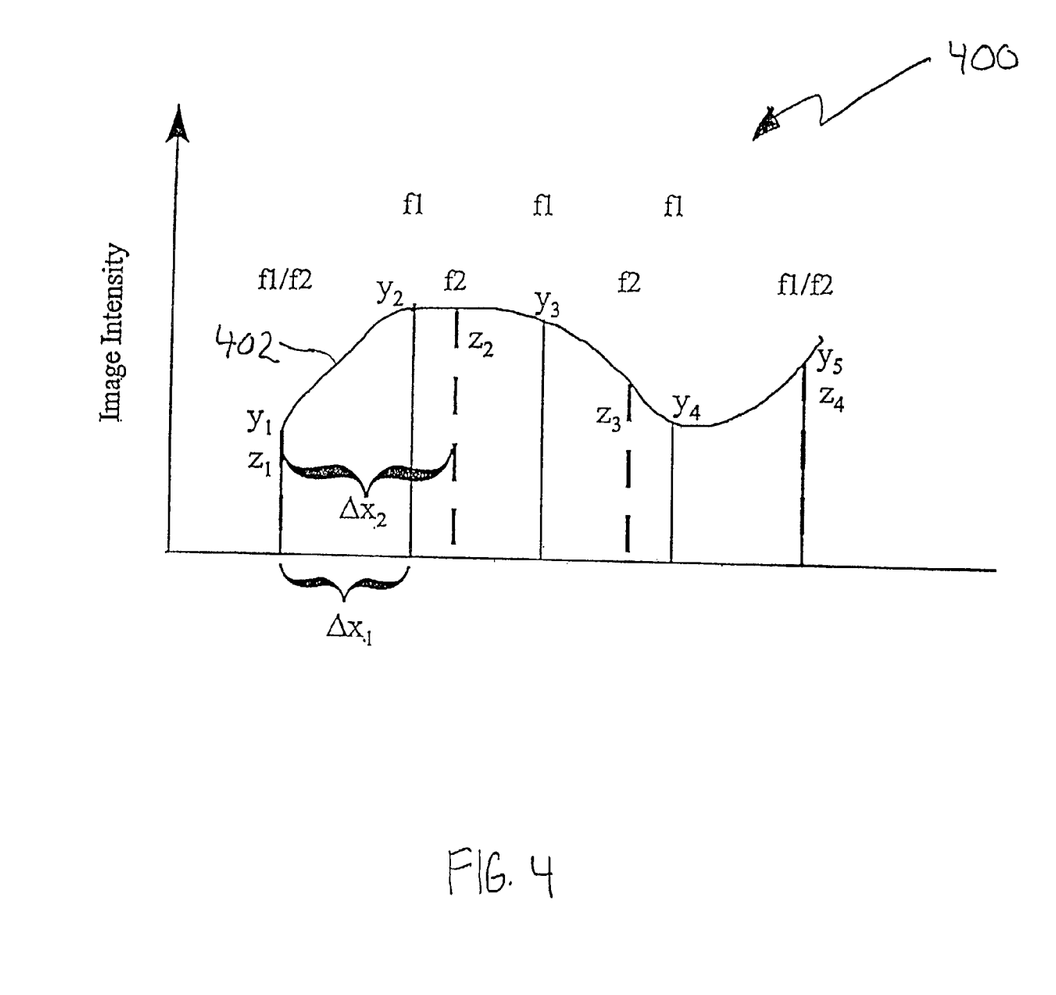
FIG. 4 illustrates a continuous intensity waveform imposed upon the sampling points of FIG. 3.

The spatial variation of a representative image intensity signal 400 is shown as a curved line 402 in FIG. 4. The sampling points $f_1$ and $f_2$ shown in FIG. 3 are also shown in FIG. 4. The $f_1$ samples points (corresponding to an altitude of 16,000 feet) are assigned amplitudes $y_i$ (the index "i" enumerating all the individual pixels). The $f_2$ sampling points are assigned amplitudes $z_j$.

As described above, the number of $f_2$ samples is less than or equal to the number of $f_1$ samples over a given spatial interval. The $f_1$ sampling points correspond to the (fixed) pixels in the focal plane array of an imager. The intensity levels, $y_i$, are the signal levels at each of the pixels. The $f_2$ sampling points correspond to the sampling points required to maintain constant resolution as the altitude of aircraft 100 changes. The location of the $f_2$ samples shown in FIG. 4 varies with altitude.

The number of output pixels formed in step 208 is related to the number of input pixels received in step 202 by a ratio of small numbers. The spatial location of certain output pixels will coincide with the spatial location of certain input pixels at regular intervals, as illustrated in FIGS. 3 and 4. By taking advantage of these spacial coincidences, the system of the present invention can reduce hardware requirements.

In order to form intermediate intensity values and combine these values to form a group of output pixels, as recited in steps 206 and 208, it is desirable to use the $y_i$ pixel intensities and the locations of the $f_2$ sampling points to determine the $z_j$ intensity levels. In general, each $z_j$ is a function of all the $y_i$ pixels. However, a simplification may be used in implementing the method so that each $z_j$ is expressed as a function of only a limited number of $y_i$'s. This simplification takes advantage of the coincidence of certain $f_1$ sampling points with certain $f_2$ sampling points.

As shown in FIG. 3, the $f_1$ and $f_2$ sampling points will coincide at regular intervals whenever the frequencies of the two sets of sampling points are a submultiple of each other. Table 2, below, illustrates the relationship between spatial frequencies at different altitudes for an imager capable of achieving a GSD of one meter at 16,000 feet. Table 2 lists two sets of sampling frequencies for the imager, which are submultiples of each other. The altitudes at which submultiples of frequencies occur, and the number of samples (pixels) obtained by the example imager between an occurrence of coincidences, is also shown. Although Table 2 lists altitudes ranging between only 16,000 feet and 8,000 feet, it should be noted that the present invention is not limited to these altitudes.

As shown in Table 2, the altitudes at which spatial frequencies are (small) submultiples of each other maybe designed according to the present invention to occur at increments of 1,000 feet. At 15,000 feet, for example, a spatial frequency in the ratio of 15:16 with the spatial frequency at 16,000 feet can achieve a one meter GSD. At 15,000 feet, therefore, the present invention can be used with the example imager to replace 16 pixels with 15 pixels while still maintaining the same image resolution that the example imager would have as at 16,000 feet.

TABLE 2

Relationship Between Spatial Frequencies At Different Altitudes

| Altitude | Freq. Needed To Maintain A Constant GSD (Lines/mm) | Ratio Of Freq. At 16,000 Feet To Freq. At A Given Altitude | No. Of F1 Lines Between Coincidences |
|---|---|---|---|
| 16,000 | 50.000 | 16:16 | 16 |
| 15,000 | 46.875 | 16:15 | 16 |
| 14,000 | 43.750 | 16:14 | 16 |

TABLE 2-continued

Relationship Between Spatial Frequencies At Different Altitudes

| Altitude | Freq. Needed To Maintain A Constant GSD (Lines/mm) | Ratio Of Freq. At 16,000 Feet To Freq. At A Given Altitude | No. Of F1 Lines Between Coincidences |
|---|---|---|---|
| 13,000 | 40.625 | 16:13 | 16 |
| 12,000 | 47.500 | 16:12 | 16 |
| 11,000 | 34.375 | 16:11 | 16 |
| 10,000 | 31.250 | 16:10 | 16 |
| 9,000 | 28.125 | 16:9 | 16 |
| 8,000 | 25.000 | 16:8 | 16 |

The method of the present invention can be used to replace a group of input pixels formed by the imager with a smaller group of output pixels. For example, Table 2 illustrates the fact that at an altitude of 10,000 feet, 16 input pixels obtained by the imager may be replaced with just 10 pixels interpolated in accordance with the present invention. This feature results in a reduced data transmission rate (reduced bandwidth) requirement for imaging systems that must transmit image data to a remote receiving station for storage and processing because fewer pixels must be transmitted in a given amount of time. This feature also reduces the amount of memory needed to store an image. How to interpolate pixels according to the present invention is further described below.

Before describing how to interpolate pixels according to the present invention, however, it should be noted here that the altitude (frequency) subdivisions listed in Table 2 are not the only subdivisions possible according to the present invention. The equations described below allow for both coarser or finer subdivisions. For example, 500 feet subdivisions are possible when using ratios of 32:X rather than 16:X. Similarly, 2,000 feet subdivisions are possible when using ratios of 8:X. As would be apparent to a person skilled in the relevant art given the discussion herein, other subdivisions are also possible. The present invention is not limited to only the subdivisions listed in Table 2.

In general, pixel interpolation according to the present invention is a process by which the signal strength of a converted pixel is determined. The signal strength of a converted pixel depends on the signal strength of each of the input pixels received in step 202. The number of input pixels used in the method of the invention generally depends on the particular interpolation algorithm used.

The amplitudes or intensities of the output pixels formed in step 208 can be derived using an interpolation formula of the form:

$$z(k\Delta x_2) = \sum_n y(n\Delta x_1) \cdot r_i(n, k) \quad \text{EQ. 2}$$

where the sum, in general, is over the index "n" from $n=-\infty$ to $n=+\infty$. Here, $z(k \Delta x_2)$ equals the amplitude or intensity of the kth output pixel, $y(n \Delta x_1)$ equals the amplitude of the nth input pixel, and $r_i(n, k)$ equals an interpolating function centered on the output pixel. As shown in FIG. 4, $\Delta x_1$ equals the sampling distance between two adjacent input pixels, and $\Delta x_2$ equals the sampling distance between two interpolated or output pixels.

FIG. 5 illustrates one system that can be used to implement EQ. 2, and form the z output pixels from the y input pixels. The weighting factors or weighting cells ($W_{ij}$) shown in FIG. 5 are represented in EQ. 2 by the $r_i$'s of EQ. 2.

There are several possible interpolating functions that can be used in accordance with the present invention to select the weighting factors used to form intermediate intensity values from the input pixels. For example, a cubic B-spline function can be used, as further described below. Other possible interpolation functions that can be used to select weighting factors include an $n^{th}$-order spline function or a sinc function. In fact, there are numerous references to interpolation functions and algorithms that can be used in accordance with the present invention. See GERALD C. HOLST, SAMPLING, ALIASING, AND DATA FIDELITY FOR ELECTRONIC IMAGING SYSTEMS, COMMUNICATIONS, AND DATA ACQUISITION 144–48 (JDC Publishing, Winter Park, Fla. (1998)) (SPIE Press Series, No. 55).

Using a cubic B-spline interpolation function, the method of the invention can be implemented using just the two nearest neighbors on either side of an interpolated pixel. Other interpolation functions can be used, and the present invention is not limited to using a cubic B-spline interpolation function. Other interpolation functions may require using a different number of input pixels to form an output pixel.

A cubic B-spline function is defined as:

$$r_3(k) = \frac{1}{2} \cdot |z|^3 - z^2 + \frac{2}{3}, \text{ where } 0 \le |z| < 1 \quad \text{EQ. 3}$$

$$= \frac{1}{6} \cdot (2 - |z|^3), \text{ where } 1 \le |z| < 2$$

$$= 0 \text{ elsewhere}$$

where: $z=(nm_s-k)/m_s$, and $m_s$ is the spacing between input pixels. A cubic B-spline interpolation function has continuous first and second derivatives.

Figure 6:
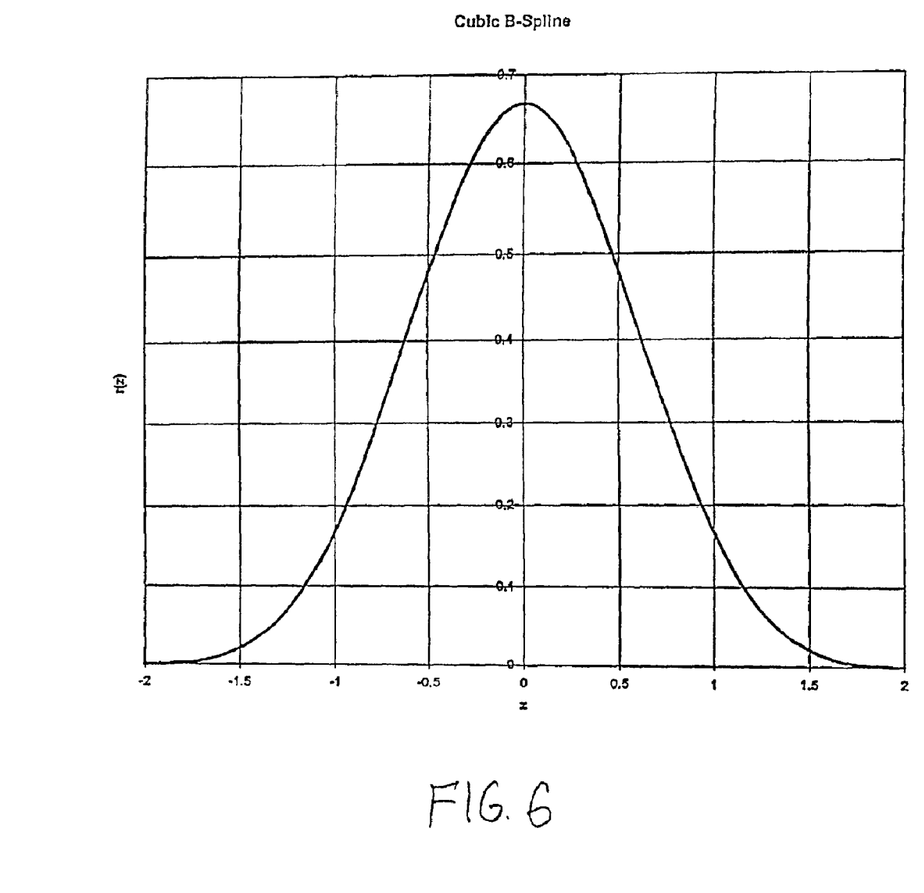
FIG. 6 illustrates an example interpolation function.

This choice for $r_3(k, n)$ yields an interpolation formula of the form:

$$z(k\Delta x_2) = \sum_n (n\Delta x_1) \cdot r_3(n, k) \quad \text{EQ. 4}$$

where the sum extends over the two nearest neighbors on either side of the interpolation point $r_3(k)$. It should be noted that the "z" variable used in EQ. 4 is not the same as the "z" variable used in EQ. 3. FIG. 6 illustrates graphically the evaluation of $z(k \Delta x_2)$.

Using EQ. 4 for each altitude range, the output pixels formed in step 208 can be determined in terms of the initial intensity values (amplitudes) of the input pixels and the location of the new output pixels relative to the input pixels. Each contiguous group of 16 input pixels is replaced by a group of output pixels illustrated in Table 2 above. For example, from Table 2, at 14,000 feet, the number of output pixels formed from 16 input pixels is 14.

Figure 7:
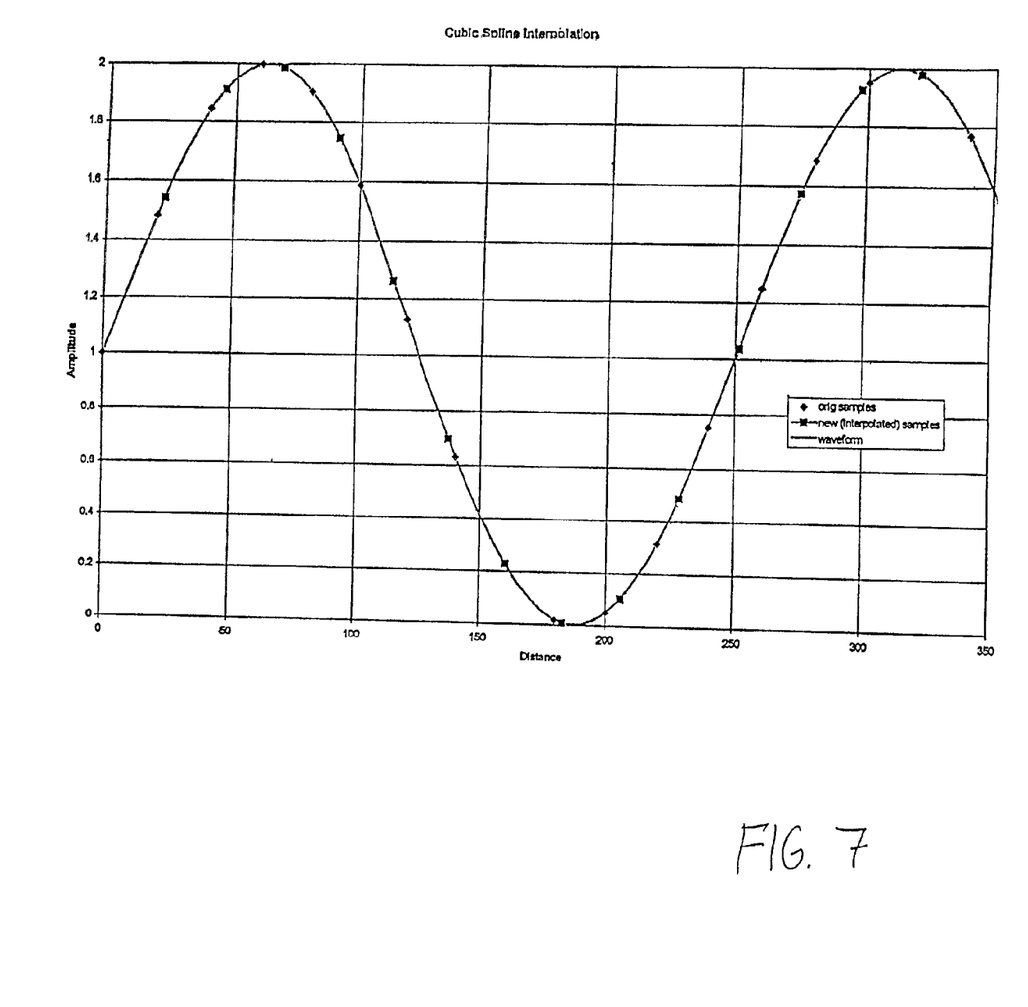
FIG. 7 illustrates an example waveform showing the relationship between initial sampled values of an imaging system and sampled values after interpolation.

Table 3 below shows the intensity values of the 14 output pixels formed from 16 input pixels obtained by sampling the sinusoidal pattern of EQ. 5.

$$y = 1 + \sin\left(\frac{2\pi x_n}{\lambda}\right) \quad \text{EQ. 5}$$

where $\lambda$ equals 250 $\mu$m, and $x_n$ equals the input pixel sampling points $\{0 \,\mu\text{m}, 10 \,\mu\text{m}, 20 \,\mu\text{m}, \ldots\}$. FIG. 7 shows a graph of the waveform, the pixel sampling points, and the output sampled values (output pixels) formed in accordance with the method of the invention.

In optional step 210, the number of output pixels formed in step 208 is selected based on a distance between the imager and an object. This feature of the invention is illustrated, for example, in Table 2. As illustrated in Table 2 and described herein, sixteen input pixels can be replaced by fourteen output pixels when the imaging device is carried aboard aircraft 100 flying at an altitude of 14,000 feet (i.e., the distance between the imager and objects on the ground is about 14,000 feet). As also illustrated in Table 2, sixteen input pixels can be replaced by nine output pixels when the imaging device is carried aboard aircraft 100 flying at an altitude of 9,000 feet (i.e., the distance between the imager and objects on the ground is about 9,000 feet). This feature of the invention can be implemented, for example, by setting switches (not shown) of system 500 that determine how many output pixels will be used to replace a predetermined number of input pixels. If it is known that aircraft 100 will be flying at an altitude of 12,000 while the imager is operational, the switches can be set (e.g., before aircraft 100 takes offs for its mission) so that twelve output pixels are formed from a group of sixteen input pixels.

In optional step 212, the number of output pixels formed in step 208 is dynamically adjusted based on a distance between the imager and an object. According to this feature, if aircraft 100 is flying at an altitude of 14,000 feet when the imaging device is activated by the pilot, fourteen output pixels would be formed from sixteen input pixels. Similarly, if aircraft 100 is flying at an altitude of 8,000 feet when the imaging device is activated by the pilot, eight output pixels would be formed from sixteen input pixels. An advantage of this feature is that there is no need to set switches before aircraft 100 takes off for its mission. The number of output pixels formed can be based, for example, on an input taken from an altimeter onboard aircraft 100. Thus, if aircraft 100 has to fly at an altitude other than that planned for prior to the takeoff of aircraft 100, this feature of the invention will nevertheless ensure an optimal number of output pixels is formed from a predetermined number of input pixels. This feature allows different legs of a tactical reconnaissance imaging mission to be flown at different altitudes without affecting image resolution.

The steps of the method described herein can also be carried out in two dimensions (e.g., when used with a staring imager) provided an imager has excess resolution in two dimensions.

In hyperspectral imaging, in which one axis is wavelength and the other axis is spatial distance, the spatial dimension is amenable to processing. In this case, the one-dimensional embodiment of the present invention described herein can be applied to the spatial dimension, while the spectral dimension is maintained unchanged.

Figure 8A:
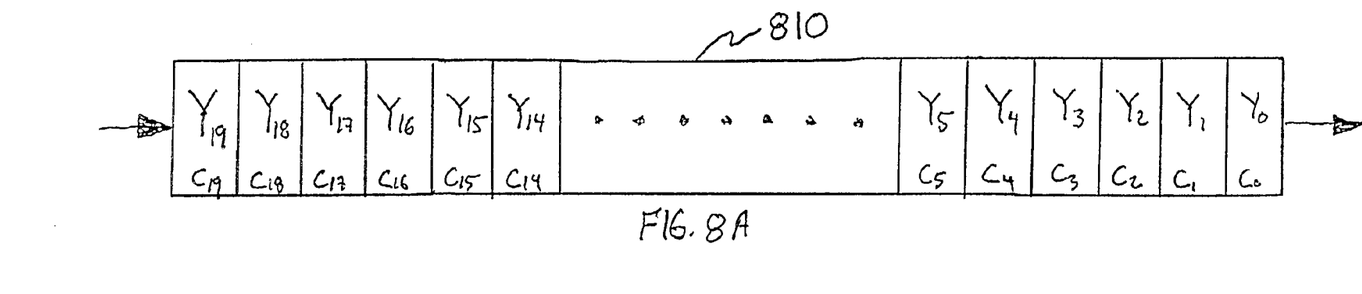
FIGS. 8A–C illustrate how groups of output pixels are formed from groups of input pixels.

In carrying out the method of the present invention, as described herein, each group of 16 input pixels is operated upon to produce a group of output pixels, which comprises 16 or fewer pixels. In order to better understand this aspect of the method, imagine that a first group of twenty input pixels is received and temporarily stored in a buffer 810, as shown in FIG. 8A, to form a first group of output pixels (not shown). Buffer 810 is similar to buffer 510 in FIG. 5 except that buffer 810 comprises twenty memory locations, or cells $C_0$–$C_{19}$, instead of five. As shown in FIG. 8A, the first group of twenty input pixels comprises a group of sixteen input pixels $\{Y_2, Y_3, \ldots, Y_{16}, Y_{17}\}$ to be replaced by a group of output pixels, plus four additional pixels $\{Y_0, Y_1, Y_{18}, Y_{19}\}$ i.e., two pixels on each end of the group of sixteen input pixels) to be used in forming the group of output pixels. As illustrated in FIG. 8A, pixel $Y_{18}$ is in cell $C_{18}$ of buffer 810 and pixel $Y_{19}$ is in cell $C_{19}$.

Figure 8B:
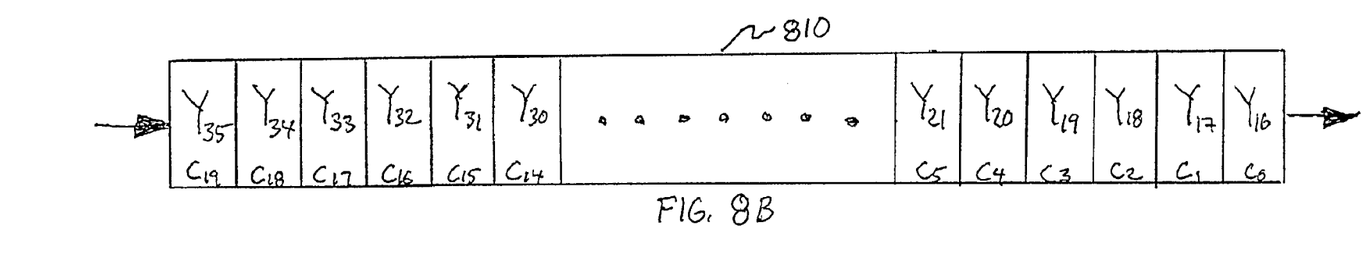
Figure 8C:
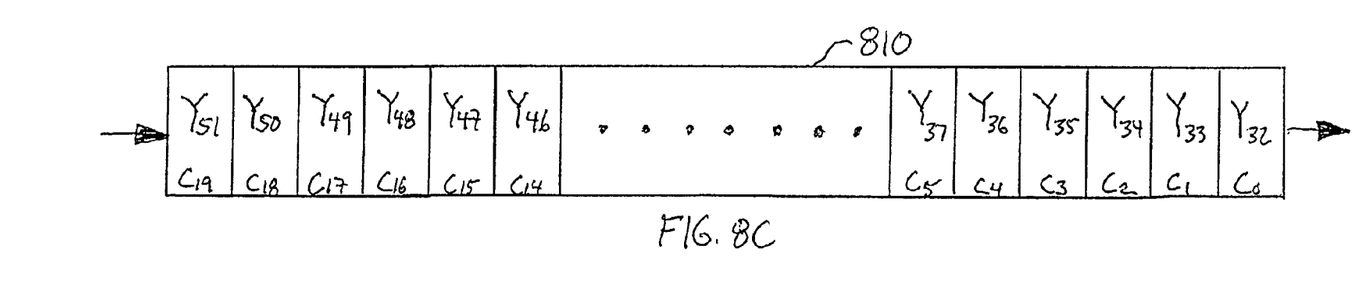

After the first group of output pixels is formed, the input pixels are shifted in buffer 810 so that another next group of sixteen input pixels to be replaced is located in cells $C_2$ through $C_{17}$, as shown in FIG. 8B. These pixels are shifted into buffer 810 from a stream of input pixels (not shown). As illustrated in FIG. 8B, pixel $Y_{18}$ is stored in cell $C_2$ of buffer 810 and pixel $Y_{19}$ is stored in cell $C_3$ after the shift. Pixels $Y_{16}$ and $Y_{17}$ occupy cells $C_0$ and $C_1$, respectively, after the shift, as shown in FIG. 8B. Pixels $Y_{16}$ and $Y_{17}$ are used in forming a second group of output pixels, as shown in FIG. 8B, even though they were also used to form the first group of output pixels. After the second group of output pixels is formed, new input pixels are shifted into buffer 810 again, as illustrated in FIG. 8C. This process continues until all the input pixels of the input pixel stream have been converted.

One advantage of the method, as described herein, is that the output group of pixels for each input group of pixels can be determined in the same manner, independent of which input group is being processed. Thus, the weighting factors described herein can be predetermined, and each output pixel can be formed by summing the weighted amplitudes of neighboring input pixels (e.g., intermediate intensity values). This method of forming output pixels from input pixels is simpler to implement than methods that determine weighting factors on the fly.

As described herein, the method of the invention can be used to improve the signal to noise ratio (SNR) of a stream of pixels. The SNR is improved for the same statistical reasons that the variation of the mean of a number of samples has a smaller standard deviation than the samples themselves. This feature of the invention is shown by the following set of calculations.

In an embodiment of the invention, the signal and noise associated with an interpolated signal are given by EQ. 6 and EQ. 7.

$$\text{Signal} = \sum_{i=1}^{4} (S_i \cdot r_i) \qquad \text{EQ. 6}$$

$$\text{Noise}_{(rms)} = \sqrt{\sum_{i=1}^{4} (N_i \cdot r_i)^2} \qquad \text{EQ. 7}$$

where $r_i \geq 0$

EQ. 6 is similar to EQ. 2 and EQ. 4. In EQ.6, the variables have been rewritten using a form that will clarify the following description of the invention. The four $S_i$'s in EQ. 6 represent the amplitudes of four original (input) pixels surrounding the location of an interpolated (output) pixel. The $r_i$'s in EQ. 6 represent, for example, the cubic splines represented by $r_3$ in EQ. 4. In EQ. 7, the four $N_i$'s represent the noise associated with each of the four original pixels. The noise associated with each of the four original pixels may be assumed to be uncorrelated.

For a case in which the waveshape to be interpolated according to the method of the invention is a constant, each $S_i$ in EQ. 6 is equal to a constant "A." It follows, therefore, that the interpolated signal must also be equal to the same constant "A," as illustrated by EQ. 8.

$$\sum_{i=1}^{4} S_i \cdot r_i = \sum_{i=1}^{4} A \cdot r_i = A \qquad \text{EQ. 8}$$

From EQ. 8, it follows that the sum of the $r_i$'s equals one, as shown in EQ. 9.

$$\sum_{i=1}^{4} r_i = 1. \quad \text{EQ. 9}$$

As will be understood by a person skilled in the relevant art, EQ. 8 and EQ. 9 may also be used where the waveshape to be interpolated is not constant, but varies slowly between pixels, e.g., in small neighborhoods where the $S_i$'s and $N_i$'s are approximately constant. This point is demonstrated by the data in Tables 3–5 below. In Table 4, the $r_i$'s for a particular implementation of the invention have been calculated. As can be seen by looking at the data in Table 4, each set of $r_i$'s obeys EQ. 9.

Using EQ. 9, it will now be demonstrated that the method of the invention can be used to improve the signal to noise ratio (SNR) of a stream of pixels. Using EQ. 6 and EQ. 7, the SNR of an interpolated signal is given by EQ. 10.

$$SNR = \frac{\sum_i S_i \cdot r_i}{\sqrt{\sum_i (N_i \cdot r_i)^2}} \quad \text{EQ. 10}$$

As would be known to a person skilled in the relevant art, a sum of squares is always less than or equal to the square of the sum, as illustrated by EQ. 11 and EQ. 12.

$$\left(\sum_i N_i \cdot r_i\right)^2 = \sum_i (N_i \cdot r_i)^2 + \sum_i \sum_{j \neq i} N_i N_j r_i r_j \quad \text{EQ. 11}$$

where $N_i$, $N_j$, $r_i$, and $r_j$ are all positive numbers.

$$\sum_i (N_i \cdot r_i)^2 \leq \left(\sum_i N_i \cdot r_i\right)^2 \quad \text{EQ. 12}$$

Using substitution, EQ. 10 can be rewritten as EQ. 13.

$$SNR = \frac{\sum_i S_i \cdot r_i}{\sqrt{\sum (N_i \cdot r_i)^2}} \geq \frac{\sum_i S_i \cdot r_i}{\sqrt{\left(\sum_i N_i \cdot r_i\right)^2}} \geq \frac{\sum_i S_i \cdot r_i}{\left(\sum_i N_i \cdot r_i\right)} \quad \text{EQ. 13}$$

Applying the principle of EQ. 9 to EQ. 6 and EQ. 7, and assuming the $S_i$'s and $N_i$'s are constant within a small region, produces EQ. 14 and EQ. 15.

$$\sum_i S_i \cdot r_i = S \cdot \sum_i r_i = S \quad \text{EQ. 14}$$

$$\sum_i N_i \cdot r_i = N \cdot \sum_i r_i = N \quad \text{EQ. 15}$$

Finally, substituting EQ. 14 and EQ. 15 into EQ. 13 produces EQ. 16, which demonstrates that the SNR of the interpolated signal is greater than or equal to the SNR of a single pixel in the neighborhood of interest.

$$SNR \geq \frac{S}{N} \quad \text{EQ. 16}$$

To further illustrate this feature of the invention, a comparison of the average SNR of interpolated signals to original signals was performed. The results of this comparison are presented in Table 3 and Table 5. As can be seen, the comparison shows that the invention can be used to improve the SNR of a stream of pixels.

The test signal used for the comparison is given in EQ. 17.

$$y = N_e \cdot \left(1 + \sin\left(\frac{2\pi x_n}{\lambda}\right)\right) \quad \text{EQ. 17}$$

where: $\lambda$ equals the test signal wavelength;

$x_n$ equals the original sampling points $\{0\,\mu\text{m}, 10\,\mu\text{m}, 20\,\mu\text{m}, \ldots\}$, and $N_e$ is the number of electrons generated in a pixel by the incident photons from the scene being imaged.

A value of 500 for $N_e$ was selected for computational ease in the comparison. In implementations of the invention, a typical value for $N_e$ is $1 \times 10^6$ electrons. In the generation of Table 3 and Table 5, the noise is assumed to have a Poisson distribution so that $N = S^{1/2}$.

A value of 100 $\mu$m was chosen for $\lambda$ for the first set of tests. This value allows margin for the Nyquist limit of two pixels per sample for the interpolated samples at a separation of 40 $\mu$m (8,000 foot altitude case). The original 16 samples for the test signal were replaced in two separate runs by 14, and 8 samples, corresponding to aircraft altitudes of 14,000 feet and 8,000 feet, respectively. The results of the runs are shown in Table 3 and Table 5.

The data in Table 3 and Table 5 illustrate extremes in the number of interpolated (output) pixels. At an altitude of 14,000 feet, sixteen original (input) pixels are replaced by 14 pixels. At an altitude of 8,000 feet, sixteen pixels are replaced by eight pixels.

Generally, as can be seen in the data in Table 3 and Table 5, the improvement in average SNR obtained using the invention is independent of aircraft altitude and/or the number of output pixels. The variation seen in the data of Table 3 and Table 5 is primarily a result of the averaging scheme used in the example comparison. The average SNR of the interpolated samples is seen to be greater than the average SNR of the original samples in both tables.

In the limit of a constant amplitude signal at a target, the SNR can be calculated analytically for an aircraft flying at an altitude of 8,000 feet. Table 4 shows the values for the $r_i$ coefficients, which are the same for all pixels. The SNR is given in EQ. 18.

$$SNR = \frac{\sum_i S_i \cdot r_i}{\sqrt{\sum_i (N_i \cdot r_i)^2}} = \frac{S \cdot \sum r_i}{\sqrt{S} \cdot \sqrt{(\sum r_i^2)}} = \frac{\sqrt{S}}{\sqrt{(\sum r_i^2)}} \quad \text{EQ. 18}$$

In this example the noise is assumed to have a Poisson distribution so that $N = S^{1/2}$.

TABLE 3

Aircraft Altitude = 14,000 ft

| | Original Samples | | | | Interpolated Samples | | | |
|---|---|---|---|---|---|---|---|---|
| index | distance μm | signal electrons | S/N | index | distance μm | signal electrons | noise | S/N |
| 1 | 0 | 500 | 22.22 | 1 | 0.0 | 500 | 22.4 | 22.22 |
| 2 | 20 | 976 | 32.15 | 2 | 22.9 | 880 | 21.5 | 41.667 |
| 3 | 40 | 794 | 28.57 | 3 | 45.7 | 603 | 17.6 | 34.483 |
| 4 | 60 | 206 | 14.286 | 4 | 68.6 | 150 | 7.9 | 18.868 |
| 5 | 80 | 24 | 4.95 | 5 | 91.4 | 305 | 11.9 | 25.641 |
| 6 | 100 | 500 | 22.22 | 6 | 114.3 | 800 | 20.2 | 40.00 |
| 7 | 120 | 976 | 31.25 | 7 | 137.1 | 777 | 19.9 | 38.462 |
| 8 | 140 | 794 | 28.57 | 8 | 160.0 | 274 | 10.7 | 25.641 |
| 9 | 160 | 206 | 14.286 | 9 | 182.9 | 161 | 6.6 | 24.39 |
| 10 | 180 | 24 | 4.95 | 10 | 205.7 | 633 | 17.0 | 37.037 |
| 11 | 200 | 500 | 22.22 | 11 | 228.6 | 872 | 20.4 | 43.478 |
| 12 | 220 | 976 | 31.25 | 12 | 251.4 | 465 | 14.3 | 32.258 |
| 13 | 240 | 794 | 28.57 | 13 | 274.3 | 118 | 5.8 | 20.00 |
| 14 | 260 | 206 | 14.286 | 14 | 297.1 | 432 | 14.9 | 29.412 |
| 15 | 280 | 24 | 4.95 | | | | avg. | 31.00 |
| 16 | 300 | 500 | 22.22 | | | | | |
| | | avg. | 20.38 | | | | | |

TABLE 4

Ri Coefficients
(8,000 Feet Altitude Example)

| $r_{-2}$ | 0.1667 | $r_{-2}^2$ | 0.0278 |
|---|---|---|---|
| $r_{-1}$ | 0.6667 | $r_{-1}^2$ | 0.0444 |
| $r_1$ | 0.1667 | $r_1^2$ | 0.0278 |
| $r_2$ | 0 | $r_2^2$ | 0 |
| $\Sigma r_1$ | 1.000 | $\Sigma r_i^2$ | 0.1000 |

TABLE 5

Aircraft Altitude = 8,000 ft

| | Original Samples | | | | Interpolated Samples | | | |
|---|---|---|---|---|---|---|---|---|
| index | distance μm | signal electrons | S/N | index | distance μm | signal electrons | noise | S/N |
| 1 | 0 | 500 | 22.2 | 1 | 0 | 500 | 22.4 | 22.22 |
| 2 | 20 | 976 | 31.25 | 2 | 40 | 726 | 19.6 | 37.04 |
| 3 | 40 | 794 | 28.57 | 3 | 80 | 134 | 5.5 | 14.39 |
| 4 | 60 | 206 | 14.286 | 4 | 120 | 866 | 21.7 | 40.0 |
| 5 | 80 | 24 | 4.95 | 5 | 160 | 274 | 10.7 | 25.64 |
| 6 | 100 | 500 | 22.22 | 6 | 200 | 500 | 15.8 | 31.25 |
| 7 | 120 | 976 | 31.25 | 7 | 240 | 726 | 19.6 | 37.04 |
| 8 | 140 | 794 | 28.57 | 8 | 280 | 134 | 5.5 | 24.39 |
| 9 | 160 | 206 | 14.286 | | | | avg. | 29.00 |
| 10 | 180 | 24 | 4.95 | | | | | |
| 11 | 200 | 500 | 22.22 | | | | | |
| 12 | 220 | 976 | 31.25 | | | | | |
| 13 | 240 | 794 | 28.57 | | | | | |
| 14 | 260 | 206 | 14.286 | | | | | |
| 15 | 280 | 24 | 4.95 | | | | | |
| 16 | 300 | 500 | 22.22 | | | | | |
| | | avg. | 20.38 | | | | | |

Method for Transforming Image Resolution

As described herein, the present invention is particularly well adapted for use with an airborne imaging system. A further feature of the invention allows a variable resolution image to be converted to a fixed resolution image. This feature of the invention can be used, for example, to control access to an image database.

Figure 9:
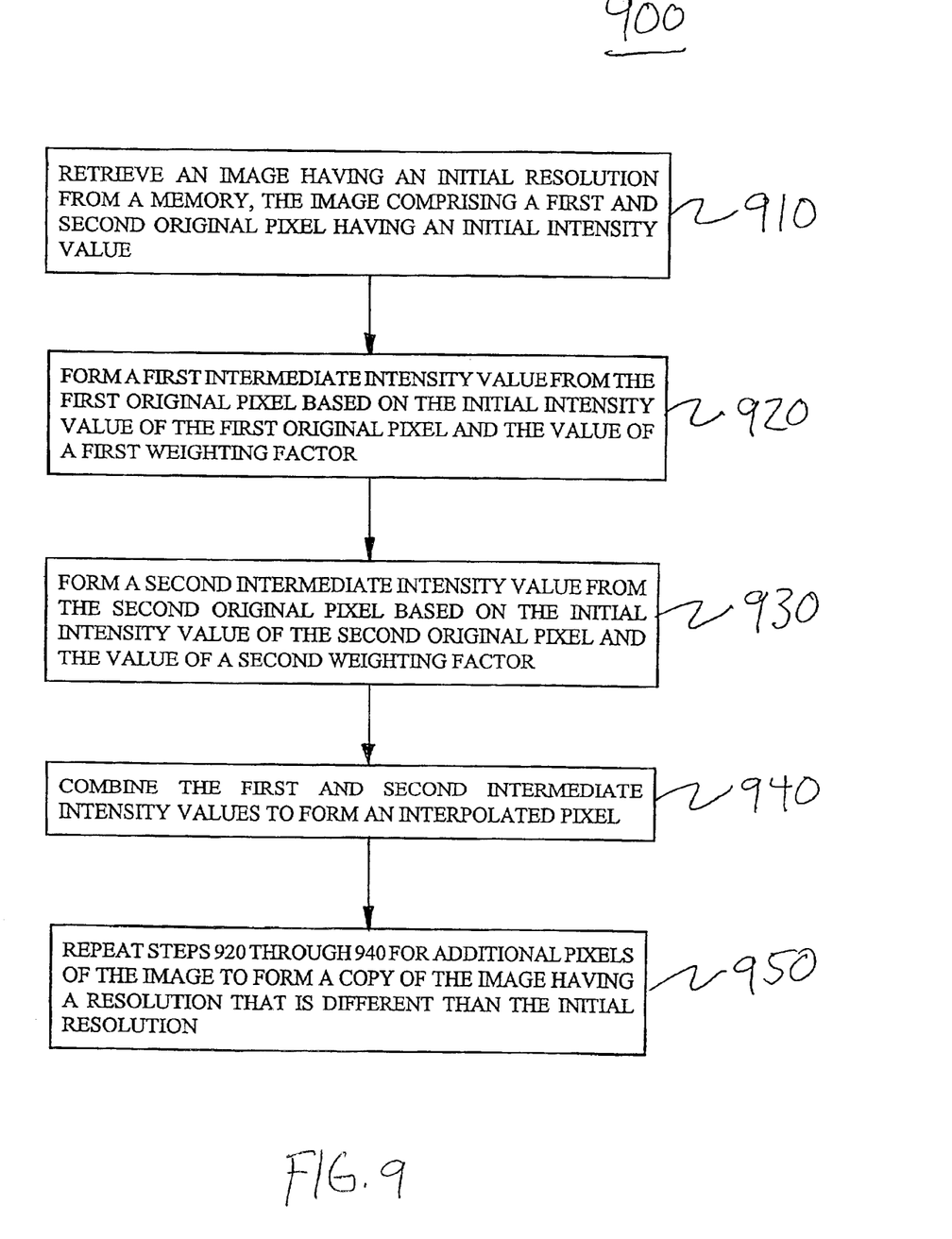
FIG. 9 is a flowchart of a method for transforming image resolution.

FIG. 9 is a flowchart of a method 900 for transforming image resolution according to the invention. As illustrated in FIG. 9, method 900 comprises five steps.

In step 910, an image having an initial resolution is retrieved from a memory. The image retrieved comprises at least a first and second original pixel having an initial intensity value. As would be known to a person skilled in the relevant art, an image can be stored, for example, on a computer or a server that forms part of an interconnected network of computers. Images are typically stored as an array of digital values. Storage mediums that are capable of storing these digital values are typically referred to as memory. Groups of images can be stored together in memory as a database of images. Storing images in a database allows a requester located at a network terminal to request and receive images stored in memory.

As described herein with regard to the method of the invention, the pixels of the image retrieved in step 910 can be optionally filtered in order to prevent aliasing. There are many lowpass filters and/or filtering techniques that can be applied to the pixels retrieved in step 910 in order to prevent aliasing. Given the description of the present invention herein, a person skilled in the relevant art will be able to determine whether the pixels of the image retrieved in step 910 should be lowpass filtered.

Steps 920, 930, and 940 of the method 900 are described together. In steps 920 and 930, at least one intermediate intensity value for each pixel of the image retrieved in step 910 is formed. In step 940, the intermediate intensity values formed in steps 920 and 930 are combined to form a group of output pixels. How to implement steps 920, 930, and 940 will be known to a person skilled in the relevant art given the description of the invention herein.

In step 950 of method 900, steps 920, 930, and 940 are repeated for additional pixels of the image retrieved in step 910. Step 950 ends when a copy of the image retrieved in step 910 has been formed. The copy of the image formed has a resolution that is different than the resolution of the image retrieved in step 910.

Method 900 can be used, for example, to control access to a database of images. For example, several images having a resolution of one-meter may be stored in a commercial database of images, which are available for purchase by members of the public (i.e, image requesters) via the INTERNET. For business reasons, the owner of the database may want to charge requesters who access the database a price that varies depending on the resolution of an image retrieved from the database. For example, the owner of the database may charge one price for retrieving a one-meter resolution image, and a second, lower price for retrieving a three-meter resolution image.

Using the invention described herein, the owner of the database can store a one-meter image in an image database, and use method 900 to generate a copy of the image having a three-meter resolution for sale to a requester who only needs and wants to pay for accessing a three-meter resolution image. A software header attached to a request to access an image can be used, for example, to determine the resolution of the copy of the image produced in step 950 of method 900. Having an ability to make copies of an image stored on a server (a variable resolution image) with any desired resolution (a fixed resolution image) eliminates the need for storing multiple copies of an image, each image having a different resolution, on the server. Thus, the invention can be used to reduce costs to the owner of an image database.

Additional features and applications of method 900, as well as how to implement these features and applications, will be apparent to a person skilled in the relevant art given the description of the invention herein.

Conclusion

Various embodiments of the present invention have been described above. It should be understood that these embodiments have been presented by way of example only, and not limitation. It will be understood by those skilled in the relevant art that various changes in form and details of the embodiments described above may be made without departing from the spirit and scope of the present invention as defined in the claims. Thus, the breadth and scope of the present invention should not be limited by any of the above-described exemplary embodiments, but should be defined only in accordance with the following claims and their equivalents.

What is claimed is:

1. A method for enhancing performance in an imaging device, comprising the steps of:

(1) receiving two or more input pixels obtained by an imager having a fixed focal length;

(2) forming two or more groups of intermediate weighted values, each group (i) respectively corresponding to one of the two or more input pixels and (ii) including a plurality of weighted values, each value being based upon a separate weighting factor; and (3) combining respective intermediate weighted values from each of the groups to form a corresponding plurality of output pixels.

2. The method of claim 1, wherein step (1) comprises the step of:

receiving a group of input pixels to be used in forming the output pixels of step (3).

3. The method of claim 2 wherein step (1) comprises the step of:

receiving a group of at least sixteen input pixels.

4. The method of claim 3, wherein step (3) comprises the step of:

forming at least eight output pixels.

5. The method of claim 1, further comprising the step of:

selecting the two or more groups of intermediate weighted values in accordance with an interpolation function.

6. The method of claim 1, further comprising the step of:

selecting the two or more groups of intermediate weighted values in accordance with a cubic B-spline function.

7. The method of claim 1, further comprising the step of: selecting the two or more groups of intermediate weighted values in accordance with an nth-order spline function.

8. The method of claim 1, further comprising the step of:

selecting the two or more groups of intermediate weighted values in accordance with a sinc function.

9. The method of claim 5, wherein the number of output pixels is less than the number of input pixels received in step (1).

10. The method of claim 9, wherein step (3) comprises the step of:

selecting the number of output pixels based on a distance between the imager and an object.

11. The method of claim 9, wherein step (3) comprises the step of:

dynamically adjusting the number of output pixels based on a change in distance between the imager and an object.

12. The method of claim 9, wherein step (1) comprises the step of:

low-pass filtering the input pixels.

13. A system for enhancing the performance of an imaging device having a fixed focal length, comprising:

a pixel receiving module to receive and temporarily store two or more input pixels obtained by an imager;

a pixel weighting module coupled to said pixel receiving module for forming two or more groups of intermediate weighted values, each group (i) respectively corresponding to one of the two or more input pixels and (ii) including a plurality of weighted values, each value being based upon a separate weighting factor; and a pixel combining module coupled to said pixel weighting module to combine respective intermediate weighted values from each of the groups to form a corresponding plurality of output pixels.

14. The system of claim, 13, wherein said pixel receiving module is a buffer capable of receiving and temporarily storing a predetermined number of pixels.

15. The system of claim 14, wherein said pixel weighting module comprises:

a plurality of weighting cells coupled to said buffer, wherein each of said plurality of weighting cells receives at least two inputs, one input comprising a pixel intensity value from said buffer and one input comprising a weighting value, and wherein each of said plurality of weighting cells combines the at least two inputs to form an intermediate intensity value.

16. The system of claim 15, wherein the number of output pixels formed by said pixel combining module is selected based on a distance between the imager and an object.

17. The system of claim 15, wherein the number of output pixels formed by said pixel combining module is dynamically adjusted based on a change in distance between the imager and an object.

18. A method for transforming image resolution, comprising the steps of:

(1) retrieving an image having an initial resolution from a memory comprised of two or more original pixels;

(2) forming two or more groups of intermediate weighted values, each group (i) respectively corresponding to one of the two or more input pixels and (ii) including a plurality of weighted values, each value being based upon a separate weighting factor;

(3) combining respective intermediate weighted values from each of the groups to form a corresponding plurality of output pixels; and (4) repeating steps (2) through (3) for additional pixels of the image to form a copy of the image having a resolution that is different than the initial resolution.

19. The method of claim 18, wherein step (1) comprises the step of:

retrieving the image from a network server used to store images.

20. The method of claim 18, wherein step (1) comprises the step of:

receiving a group of original pixels to be used in forming the output pixels of step (3).

21. The method of claim 20, wherein step (1) comprises the step of:

low-pass filtering the original pixels.

22. The method of claim 18, further comprising the step of:

(5) selecting the weighting factors of step (2) in accordance with an interpolation function.

23. The method of claim 18, wherein step (5) comprises the step of:

using a cubic B-spline function to select the weighting factors.

24. The method of claim 18, wherein step (5) comprises the step of:

using an nth-order spline function to select the weighting factors.

25. The method of claim 18, wherein step (5) comprises the step of:

using a sinc function to select the weighting factors.

26. The method of claim 18, wherein step (4) comprises the step of:

forming a copy of the image having a resolution that is determined based on a requester's access rights.

* * * * *